(12) United States Patent
Hogervorst

(10) Patent No.: US 8,104,843 B2
(45) Date of Patent: Jan. 31, 2012

(54) TRAILER FOR THE TRANSPORTATION BY ROAD OF CONTAINERS

(75) Inventor: Wouter Hendrik Hogervorst, Hoogeveen (NL)

(73) Assignee: Inlicence B.V., Hoogeveen (NL)

( * ) Notice: Subject to any disclaimer, the term of this patent is extended or adjusted under 35 U.S.C. 154(b) by 290 days.

(21) Appl. No.: 12/443,674

(22) PCT Filed: Sep. 26, 2006

(86) PCT No.: PCT/NL2006/050240
§ 371 (c)(1), (2), (4) Date: Mar. 30, 2009

(87) PCT Pub. No.: WO2008/039059
PCT Pub. Date: Apr. 3, 2008

(65) Prior Publication Data
US 2010/0096903 A1  Apr. 22, 2010

(51) Int. Cl.
*B60P 1/04* (2006.01)
(52) U.S. Cl. .......... 298/17 SG; 298/18; 298/38
(58) Field of Classification Search ......... 298/17 R, 298/22 R, 22 P, 38, 18, 17 SG; B60P 1/02, B60P 1/34
See application file for complete search history.

(56) References Cited

U.S. PATENT DOCUMENTS

| 2,963,186 | A | * | 12/1960 | Beck et al. .......... 414/494 |
| 3,712,675 | A | * | 1/1973 | Schoenwald .......... 298/10 |
| 4,149,751 | A | * | 4/1979 | Boyer .......... 298/22 P |
| 5,069,507 | A | | 12/1991 | Lindsey |
| 6,413,036 | B2 | * | 7/2002 | Welton .......... 414/812 |
| 6,761,413 | B1 | * | 7/2004 | Mathews .......... 298/18 |

FOREIGN PATENT DOCUMENTS

| WO | 00/44585 | 8/2000 |
| WO | 01/94152 | 12/2001 |

* cited by examiner

*Primary Examiner* — Glenn Dayoan
*Assistant Examiner* — Sunsurraye Westbrook
(74) *Attorney, Agent, or Firm* — Fliesler Meyer LLP

(57) ABSTRACT

The invention relates to a trailer for the transportation by road of cargo, such as containers. The trailer comprises a trailer frame; a tipping frame and lifting means which act on, on the one hand, the trailer frame and, on the other hand, the tipping frame. The trailer frame comprises a front zone which is located on coupling above a tractor unit and which is provided with a coupling member in order to effect coupling. The trailer frame also has a rear zone comprising three sets of wheels. An intermediate zone connects the front zone to the rear zone. The tipping frame extends along the trailer frame and is fastened, in the rear zone, to the trailer frame so as to hinge about a tipping axle. The trailer frame has a longitudinal beam and the tipping frame has two lateral beams. The central beam of the trailer frame is submerged between the lateral longitudinal beams of the tipping frame.

7 Claims, 3 Drawing Sheets

TRAILER FOR THE TRANSPORTATION BY ROAD OF CONTAINERS

This application is a national stage application that claims priority under 35 U.S.C. 371 to Patent Cooperation Treaty Application No. PCT/NL2006/050240, entitled "Trailer for the transportation by road of containers," inventor Wouter Hendrik Hogervorst, filed Sep. 29, 2006, and which has been published as Publication No. WO2008/039059, which application is herein incorporated by reference.

FIELD OF THE INVENTION

The present invention relates to the field of trailers for the transportation by road of cargo, such as containers. The invention relates in particular, in this regard, to trailers comprising what is known as a tipping frame. Trailers comprising a tipping frame, also known as 'tipping frame trailers', are capable of independently loading and unloading cargo, in particular containers but also other types of cargo, by pushing the cargo upward in an inclined manner along the tipping frame, for the purposes of loading, and by lowering the cargo along the inclined frame, for the purposes of unloading. Loading and unloading can, in this case, optionally be assisted by moving the trailer during the process. In the case of trailers without a tipping frame, also known as 'tipping frameless' trailers, a separate loading/unloading installation, such as a hoisting crane, is required in order to place the cargo on the trailer and to remove it from the trailer.

More specifically, the invention relates to a trailer for the transportation by road of cargo, such as one or more containers and in particular one or more sea containers, the trailer comprising:
a trailer frame,
a tipping frame,
lifting means acting on, on the one hand, the trailer frame and, on the other hand, the tipping frame,
the trailer frame comprising:
 a front zone, provided with a coupling member which is provided for coupling to a tractor unit coupling, such as the plate, provided on a tractor unit, which front zone is located on coupling to a tractor unit at least partially above said tractor unit,
 a rear zone provided with one or more, in particular two or three, sets of wheels, and
 an intermediate zone connecting the front zone and the rear zone,
the tipping frame extending along the trailer frame and, in the rear zone, being fastened to the trailer frame so as to hinge about a tipping axle in such a way that the tipping frame can be brought, using the lifting means, from a horizontal position to an inclined position in order to pick up cargo from the ground and place it on the tipping frame or to lower cargo from the tipping frame onto the ground.

BACKGROUND OF THE INVENTION

Vehicles for the transportation by road of cargo have to comply with legal requirements. An important legal requirement—in most European Union countries and countries allied thereto—is that the height of the vehicle, including cargo, should not exceed 4,000 mm. Special dispensation must be obtained when transporting taller cargo.

In accordance with this legal requirement, the maximum height of containers in circulation, so-called "high cube containers", is 2,896 mm.

The maximum container height of 2,896 mm is calculated as follows:
 what is known as the plate height of the tractor unit, such as this may be obtained in the lowest conventional height, is approximately 950 mm;
 the thickness (in the vertical direction) of the trailer portion above the plate is, in the case of a 'tipping frameless' trailer, approximately 160 mm;
 in total, this means that the loading face of the 'tipping frameless' trailer is at a height of 1,110 mm above ground level/the road;
 for the maximum height of the cargo, in the present case the container, there therefore remains the aforementioned height of 2,896 mm.

The aforementioned thickness of the trailer above the plate relates, in the present case, to that of a trailer without a tipping frame. In the case of a trailer with a tipping frame, the loading face is higher than the aforementioned 1,110 mm, because the tipping frame itself also has an additional thickness and is located substantially on the loading face of the 'tipping frameless' trailer.

Containers of maximum height are often used in transportation by sea, i.e. in the case of sea containers. When such containers of maximum height are supplied to the ship by road or removed from the ship by road, only 'tipping frameless' trailers can be used for this purpose. 'Tipping frameless' trailers have the drawback that they are incapable of independently unloading the containers. Heavy hoisting installations are required to do this. Hoisting installations of this type are expensive. This high cost of hoisting installations is perhaps not such a major problem in a port area owing to the large numbers of containers to be processed in such an area. However, at the site where the containers are dispatched or received, which is remote from the port, this problem is very apparent, because at this location the numbers of containers to be processed are much lower.

The major advantage of tipping frame trailers is that they are able to load and unload the containers completely independently. In a port environment, containers can optionally be placed on the tipping frame trailer using a hoist installation, but outside the port environment a trailer comprising a tipping frame can independently load or unload both a full and an empty container.

It will be clear that this has major advantages. However, the containers which are in practice frequently used in the case of tipping frame trailers are less tall, i.e. have a maximum height of 2,590 mm or 2,438 mm. In fact, trailers having a plate height of 1,150 mm are often used in this case.

AIM OF THE INVENTION

The aim of the invention is to provide a trailer comprising a tipping frame which is capable of transporting relatively high cargo, such as containers, in accordance with the legally permitted maximum cargo height (i.e. for which special dispensation is not required). The aim of the present invention is accordingly to provide a tipping frame trailer wherein the loading face is lowered.

SUMMARY

According to the invention, the aforementioned aim is achieved by providing a trailer for the transportation by road of cargo, such as one or more containers and in particular one or more sea containers, the trailer comprising:
a trailer frame; and
a tipping frame; and lifting means acting on, on the one hand, the trailer frame and, on the other hand, the tipping frame;
the trailer frame comprising:
a front zone, provided with a coupling member which is provided for coupling to a tractor unit coupling, such as the plate, provided on a tractor unit, which front zone is located on coupling to a tractor unit at least partially above said tractor unit;
a rear zone provided with one or more, in particular two or three, sets of wheels;
an intermediate zone connecting the front zone and the rear zone;
the tipping frame extending along the trailer frame and, in the rear zone, being fastened to the trailer frame so as to hinge about a tipping axle in such a way that the tipping frame can be brought, using the lifting means, from a horizontal position to an inclined position in order to pick up a container from the ground and place it on the tipping frame or to lower a container from the tipping frame onto the ground;
characterised in that the trailer frame comprises a central longitudinal beam carrying, in the front zone of the trailer frame, the coupling member; in that the tipping frame is defined by two lateral longitudinal beams; and in that, when the tipping frame is horizontal, the central longitudinal beam is submerged, in any case in the front zone, between the lateral longitudinal beams.

As a result of, on the one hand, constructing the trailer frame around a central longitudinal beam carrying, in the front zone, the coupling member and, in the rear zone, the one or more sets of wheels and, on the other hand, constructing the tipping frame around two longitudinal beams which, when the tipping frame is folded down, are located—viewed in a horizontal direction—laterally next to the central longitudinal beam of the trailer frame, it is achieved that in the folded-down state the central longitudinal beam of the trailer frame is, as it were, submerged, in any case at least partially submerged, between the lateral longitudinal beams. The height of the loading face of a trailer comprising a tipping frame can thus be reduced because the tipping frame is no longer located on top of the level of the 'tipping frameless' trailer loading floor but rather is lowered, in any case at least partially, to below the level of the 'tipping frameless' trailer loading face.

With a view to producing maximum lowering of the level of the loading face of a tipping frame trailer, it is according to the invention advantageous if—when the tipping frame is horizontal—the upper face of the central longitudinal beam is approximately flush, in the front zone, with the upper face of the lateral longitudinal beams. This ensures that the tipping frame is, as it were, entirely lowered/submerged below the level of the loading face of a 'tipping frameless' trailer. The level of the loading face of a tipping frame trailer is thus made flush with the level of the loading face of a 'tipping frameless' trailer. It is thus possible to transport by road the sea containers of maximum height currently in circulation (having a height of 2,896 mm) in compliance with the legislation concerning maximum permissible cargo height.

According to the invention, it is also advantageous if, when the tipping frame is horizontal, the front ends of the lateral longitudinal beams of the tipping frame protrude past the central longitudinal beam of the trailer frame; and if said lateral longitudinal beams are joined together, at the front ends thereof, by a first cross connection. The tipping frame can thus be rigidified in such a way as to ensure that when the tipping frame is tipped, the longitudinal beams also remain neatly next to each other, so a container located thereon remains correctly positioned—viewed in the transverse direction of the trailer—and cannot laterally fall off.

According to a further embodiment of the invention, the central beam of the trailer frame is higher in the front zone than in the intermediate zone or rear zone. As a result of the fact that in the case of trailers, the trailer is coupled on top of the frame of the tractor unit and the trailer in any case extends to far behind the frame of the tractor unit, the central beam can easily be lower in the intermediate zone and/or rear zone than in the front zone (where the height is dictated by the height of the tractor unit frame, in particular the plate thereon). If the intermediate zone of the central beam is lower than the front zone thereof, there is provided at this location space which is very useful for accommodating the lifting means with which the tipping frame can be brought from the horizontal position to an inclined position and can also be brought back from an inclined position to a horizontal position. Lifting means of this type can comprise a hydraulic cylinder piston system. If the central beam is lower in the rear zone than in the front zone, this has the advantage of providing additional space in order, for example, to produce a rigid support frame for the tipping axle.

In order, if the intermediate zone and/or rear zone is lowered, to provide a flat loading face level, it is according to the invention advantageous if, when the tipping frame is horizontal, the lateral longitudinal beams are higher in the intermediate zone or the rear zone, respectively, than the central longitudinal beam. This has the additional advantage that, in accordance with the invention, the lateral longitudinal beams are joined together, in the intermediate zone or in the rear zone, respectively, by one or more cross connections. The tipping frame can thus be rigidified using these cross connections, without said cross connections being in the way on the central beam of the trailer frame when the tipping frame is folded down.

According to a further embodiment of the invention, the trailer also comprises winch means configured—when the tipping frame is inclined—to raise a container along the tipping frame or to lower a container along the tipping frame.

DESCRIPTION OF AN ILLUSTRATIVE EMBODIMENT

The present invention will be explained in more detail below with reference to an illustrative embodiment represented schematically in the drawings, in which.

Figure 1:
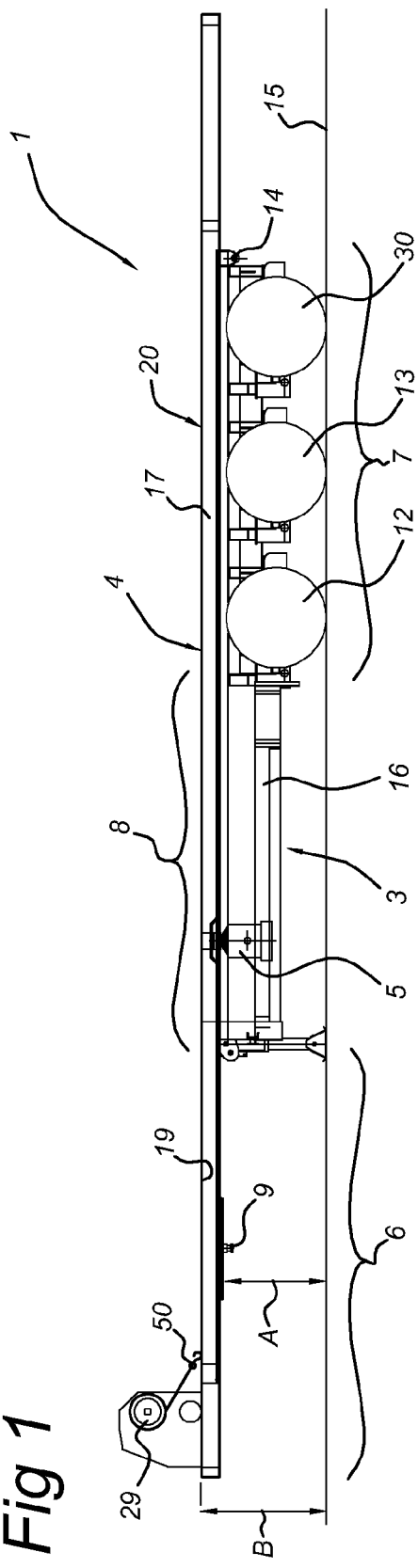
FIG. 1 is a schematic side view of a trailer according to the invention.
Figure 2:
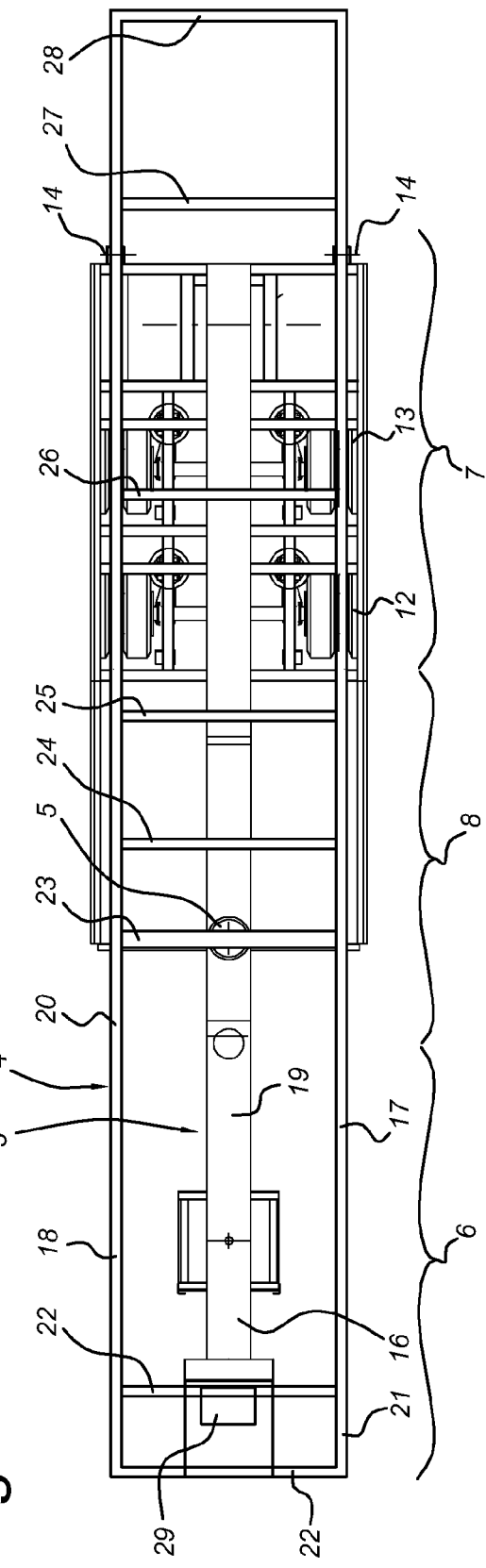
FIG. 2 is a schematic plan view, in the direction of arrow II in FIG. 1, of the trailer according to FIG. 1.
Figure 3:
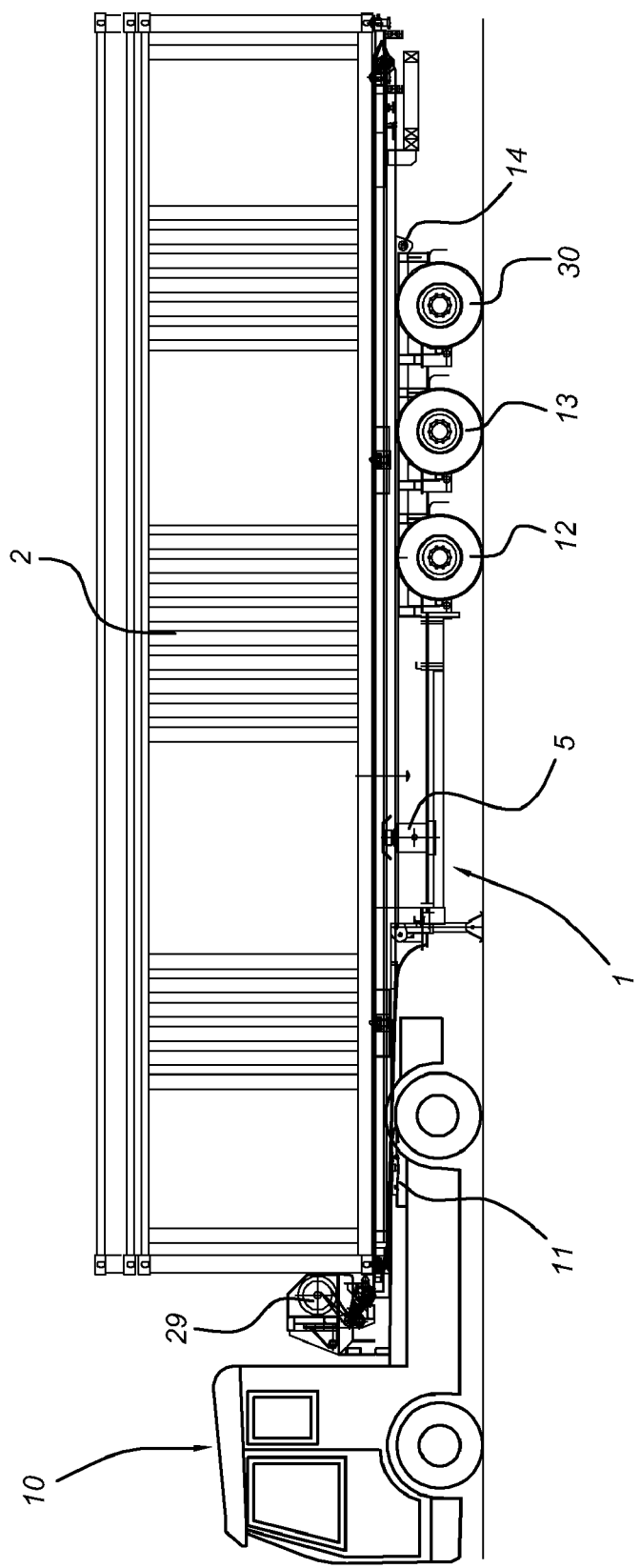
FIG. 3 is a schematic illustration of a trailer/tractor unit combination loaded with a container, the trailer being in accordance with the invention.
Figure 4:
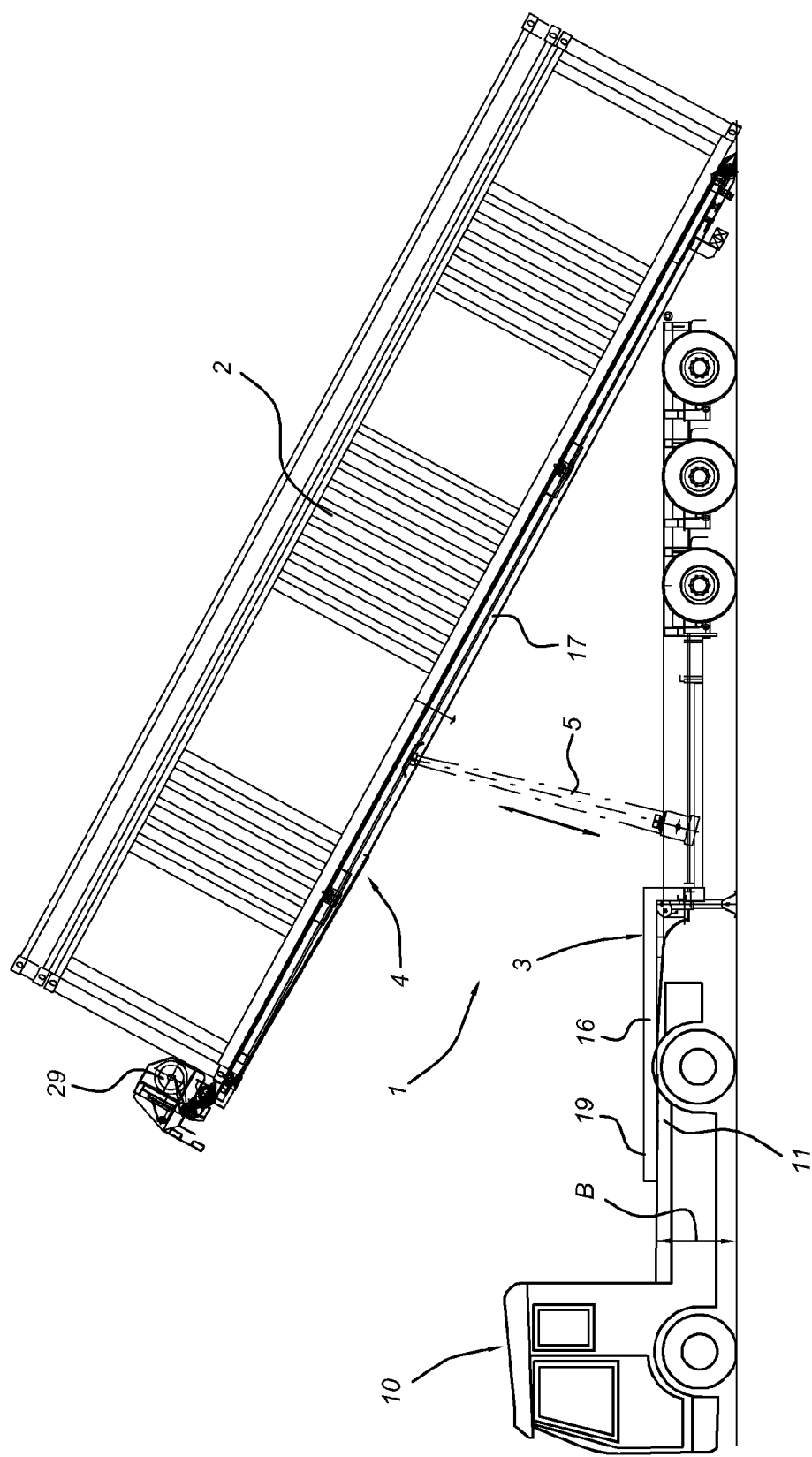
FIG. 4 is a view corresponding to FIG. 3, but in this case with an obliquely positioned tipping frame with a container thereon.

FIG. 1 and FIG. 2 shows a trailer 1 constructed from a trailer frame 3 having thereon a tipping frame 4. Also provided are lifting means 5. The tipping frame 4 and the trailer frame 3 are joined together via a tipping axle 14 so that the tipping frame can be tilted from a horizontal position, shown in FIG. 3, to an inclined position, shown in FIG. 4, of in this example approx. 28°.

Various methods and various systems are known in the art for loading or unloading a container 2 on an inclined tipping frame. Use is often made, in this regard, of winch means 29 which can be fastened to the front end of the container using a coupling member 50. If a container is located horizontally flat on the ground, the winch means can then, once the coupling member 50 has been coupled, be drawn in and tensioned. In the case of very heavy winch means or light containers, it may be possible to raise the container along the inclined tipping frame 4 using the winch means. In practice, this usually takes place in combination with simultaneous reversing of the trailer in order not excessively to load the winch means 29. For unloading a container, the procedure can be inverted.

That which has been described hereinbefore with reference to the figures is mainly known in the art. The trailer according to the invention will be considered more specifically hereinafter.

As may be seen in particular in FIGS. 1 and 2, the trailer frame 3 is subdivided into a front zone 6, a rear zone 7 and an intermediate zone 8. It may also be seen that the trailer frame 3 consists substantially of a central longitudinal beam 16. This central longitudinal beam 16 is higher in the front zone 6 than in the intermediate zone 8 and rear zone 7 because, in the front zone 6, the longitudinal beam 16 is to be positioned on top of the frame of a tractor unit 10. The tractor unit 10 is therefore conventionally provided with a plate 11 (see FIGS. 3 and 4), forming the tractor unit coupling, to which the trailer 1 can be coupled using a coupling member 9 known to specialists as the king pin.

In the rear zone 7, the trailer frame carries three sets of wheels 12, 13 and 30. There can also be more or fewer sets of wheels than as shown in the figures. One or more sets of wheels in the intermediate zone may also be conceivable.

At the trailing end of the rear zone 7, the tipping axle 14 is fastened to the trailer frame 3.

The tipping axle 4 is constructed, in accordance with the invention, from substantially two longitudinal beams 17, 18 referred to in the present case as lateral longitudinal beams 17, 18 because they are located, when the tipping frame is folded down, in any case in the front zone 6, next to the central longitudinal beam 16 of the trailer frame 3.

As is particularly apparent in FIG. 1, the upper face 19 of the longitudinal beam 16 of the trailer frame 3 is at approximately the same height—in any case in the front zone 6 and viewed in the vertical direction—as the upper face 20 of the lateral longitudinal beams 17, 18 of the tipping frame. When the tipping frame 4 is folded down, the central longitudinal beam 16 is thus entirely submerged, in any case in the front zone 6, between the lateral longitudinal beams 17 and 18. It will be clear that in accordance with the present invention, in particular claim 1, the advantages according to the invention are also achieved even if, in the front zone, a portion of the lateral longitudinal beams 17, 18 of the tipping frame is still protruding above the central beam 16 of the trailer frame. If the vertical height/thickness of the lateral longitudinal beams is, for example, 16 cm, the upper face 20 of the lateral longitudinal beams 17, 18 can, for example, be 6 cm higher than the upper face 19 of the central beam 16.

Submerging, in the front zone 6, the central longitudinal beam 16 entirely between the lateral longitudinal beams 17, 18 allows the height B of the level of the loading face of the trailer 1 to be defined, when the tipping frame is folded down, by the vertical height of the upper face 19 of the trailer frame above the ground/road 15. Said level of the loading face height B is thus rendered substantially flush with the height B of the level of the loading face of a 'tipping frameless' trailer. The level of the loading face B can be lowered further only by lowering the plate height A of the tractor unit or optionally by reducing the thickness dimensions (in the vertical direction) of the central longitudinal beam 16 and the lateral longitudinal beams 17, 18.

In order to rigidify the tipping frame, which is constructed from two mutually parallel lateral longitudinal beams 17, 18, there is provided at the front ends 21 of the lateral longitudinal beams 17, 18 a cross connection 22. Said cross connection 22 is located—viewed in the forward driving direction of the trailer—even before the front end of the central longitudinal beam 16 of the trailer frame 3.

The tipping frame 4 is further rigidified by providing in the intermediate zone 8 and/or the rear zone 7 an additional number or quantity of second cross connections 23, 24, 25, 26, 27, 28. Said second cross connections are simple to produce in the intermediate zone 8 and rear zone 7 because, at these locations, the central longitudinal beam 16 can easily be lower than the lateral longitudinal beams 17, 18 of the tipping frame and can even be located entirely therebelow. As may be seen in FIG. 1 and FIG. 2, the cross connection 23 also acts as a point of engagement at which the lifting means 5 engage with the tipping frame. It will be clear that the six second cross connections shown in FIGS. 1 and 2 are intended merely by way of example; this number can be increased or decreased. In addition, what are known as the second cross connections can also be provided at locations other than those shown in the figures.

It will be clear that in all references in the present application to the central longitudinal beam (of the trailer frame) and to the lateral longitudinal beam (of the tipping frame), said beams can be, but do not have to be, solid beams. A (longitudinal) beam can, within the scope of the claims, also be a hollow shaft, a frame construction, two or more parallel girders, etc.

The invention claimed is:

1. A trailer for the transportation by road of cargo, such as one or more containers and in particular one or more sea containers, the trailer comprising:
    a trailer frame;
    a tipping frame;
    a lifting means acting on the trailer frame and on the tipping frame;
    wherein the trailer frame comprises
        a front zone, provided with a coupling member which is provided for coupling to a tractor unit coupling, such as the plate, provided on a tractor unit, which front zone is located on coupling to a tractor unit at least partially above said tractor unit;
        a rear zone provided with one or more, in particular two or three, sets of wheels;
        an intermediate zone connecting the front zone and the rear zone;
    wherein the tipping frame extends along the trailer frame and, in the rear zone, is fastened to the trailer frame so as to hinge about a tipping axle in such a way that the tipping frame can be brought, using the lifting means, from a horizontal position to an inclined position in order to pick up a container from the ground and place it on the tipping frame or to lower a container from the tipping frame onto the ground;
    wherein the trailer frame comprises a central longitudinal beam carrying, in the front zone of the trailer frame, the coupling member;
    wherein the tipping frame is defined by two lateral longitudinal beams; and
    wherein when the tipping frame is horizontal, the central longitudinal beam is submerged, in any case in the front zone, between the lateral longitudinal beams.

2. The trailer according to claim 1, wherein, when the tipping frame is horizontal, the upper face of the central longitudinal beam is approximately flush, in the front zone, with the upper face of the lateral longitudinal beams.

3. The trailer according to claim 1 wherein, when the tipping frame is horizontal, the front ends of the lateral longitudinal beams protrude past the central longitudinal beam, and wherein said lateral longitudinal beams are joined together, at the front ends thereof, by a first cross connection.

4. The trailer according to claim 1 wherein the central beam is higher in the front zone than in the intermediate zone and/or rear zone.

5. The trailer according to claim 4, wherein, when the tipping frame is horizontal, the lateral longitudinal beams are higher in the intermediate zone or the rear zone, respectively, than the central longitudinal beam.

6. The trailer according to claim 5, wherein the lateral longitudinal beams are joined together, in the intermediate zone and/or in the rear zone, by one or more second cross connections.

7. The trailer according to claim 1 wherein the trailer also comprises winch means configured, when the tipping frame is inclined, to raise a container along the tipping frame or to lower a container along the tipping frame.

* * * * *